United States Patent [19]
Yates et al.

[11] Patent Number: 5,307,341
[45] Date of Patent: Apr. 26, 1994

[54] RANDOM ACCESS MULTIPLE USER COMMUNICATION SYSTEM

[75] Inventors: Kenneth W. Yates; Terence J. Stevenson, both of Broadway; Terence M. P. Percival, Sydney; Roksana Boreli, Sydney; Richard A. Z. Simington, Sydney, all of Australia

[73] Assignees: OTC Limited, Sydney; University of Technology, Sydney, Broadway, both of Australia

[21] Appl. No.: 842,101

[22] PCT Filed: Sep. 18, 1990

[86] PCT No.: PCT/AU90/00429
§ 371 Date: May 8, 1992
§ 102(e) Date: May 8, 1992

[87] PCT Pub. No.: WO91/04618
PCT Pub. Date: Apr. 4, 1991

[30] Foreign Application Priority Data
Sep. 18, 1989 [AU] Australia .................. PJ6416

[51] Int. Cl.[5] ............... H04B 7/216; H04L 27/28
[52] U.S. Cl. ............................ 370/18; 370/20; 370/69.1; 375/1
[58] Field of Search ............ 370/69.1, 70, 50, 18, 370/20; 375/1

[56] References Cited
U.S. PATENT DOCUMENTS

| | | | |
|---|---|---|---|
| 3,197,563 | 7/1965 | Hamsher | 179/15 |
| 3,872,255 | 3/1975 | Nance | 179/15 |
| 4,189,677 | 2/1980 | Cooper | 325/321 |
| 4,567,588 | 1/1986 | Jerrim | 370/18 |
| 4,688,210 | 8/1987 | Eizenhöfer et al. | 370/18 |
| 5,103,459 | 4/1992 | Gilhousen et al. | 370/18 |

FOREIGN PATENT DOCUMENTS

| | | |
|---|---|---|
| 199148 | 4/1986 | European Pat. Off. |
| 7417652 | 12/1975 | France |
| 2165724 | 4/1986 | United Kingdom |

Primary Examiner—Wellington Chin
Attorney, Agent, or Firm—Baker & Daniels

[57] ABSTRACT

A frequency comb multiple access (FCMA) communications system in which address and message data are transmitted on a common channel to different users. The data transmitted are in the form of signatures, each of which consists of combined specific frequencies selected from a range of discrete frequencies available in the bandwidth of the common channel. Each signature corresponds to an address and to a data message directed to the address. This system does not require handshaking nor channel assignment. A transmitter and a receiver for the system are also disclosed.

13 Claims, 14 Drawing Sheets

RANDOM ACCESS MULTIPLE USER COMMUNICATION SYSTEM

This invention is described in the following statement:

The present invention relates to multiple access schemes for use in telecommunications. For example, the invention is applicable to satellite communications, cellular mobile communications, private mobile radio and other applications where packetised digital voice or data messages are to be communicated over a limited bandwidth which is available to a plurality of users.

1.0 BACKGROUND OF INVENTION

Previous multiple access schemes for satellite communications have operated on a variety of bases. One type is where resources are assigned by some control centre on a demand basis, such as Time Division Multiple Access (TDMA).

Other systems include variants of Code Division Multiple Access (CDMA), including Frequency Hopped Code Division Multiple Access (FH-CDMA) and Direct Sequence Code Division Multiple Access (DS-CDMA). Both these systems use spread spectrum transmission techniques. In FH-CDMA, user signatures occupy a time varying narrow band, while in DS-CDMA signatures occupy the full bandwidth.

In FH-CDMA, each user modulates a hopping carrier over the full transmission bandwidth. Special sequences are used to minimise hits between hopping patterns of different users. The number of carriers available is B/H, where B is the available bandwidth to be shared and H is the hopping rate. In FH-CDMA only one carrier frequency is transmitted per time interval.

In DS-CDMA a modulated carrier is multiplied by a high symbol rate frequency spreading signal, which is usually a pseudo random binary sequence. At the receiver the "despreading" operation is performed by multiplying the received signal with a locally generated version of the original spreading signal.

U.S. Pat. No. 3,292,179 to Magnuski discloses a system which utilises a fixed range of frequencies and time shifts to address users. It does not provide an interleaved frequency system in which address and data are comprised in a single transmission.

It is the object of the present invention to provide an improved multiple user communications system, particularly but not exclusively for satellite communications, which ameliorates at least some of the deficiencies of the prior art.

2.0 SUMMARY OF INVENTION

The present invention according to one aspect relates to a system which may be described as Frequency Comb Multiple Access (FCMA). In FCMA, user signatures interleave each other as "combs" of frequencies, spread over the available bandwidth. This arrangement enables both data and address information to be contained in a single transmission or energy burst.

According to a further aspect the invention provides a coding structure to minimise overlap between user signatures and hence errors between different users.

The present invention further provides apparatus for transmitting and receiving FCMA transmissions.

The general concept of FCMA relates to a system in which many users share a common channel, which may be a bus, satellite channel, or other resource. Each user (or group of users) is identified by one or more blocks of $M = 2^k$ signatures, where k is an integer representing the number of bits transmitted per symbol. Each signature consists of a set of n specific frequencies drawn from a pool of size $N = WR$, where W is the available bandwidth of the common channel and R is the symbol rate at which communication occurs. By mutual agreement (prearranged), each signature corresponds to a specific bit pattern.

An exemplary system operates as follows: "To communicate with user y, user x sends a sequence of signatures representing the data being transmitted, from the block of signatures assigned to y. User y receives the information by monitoring the channel for signatures from its block.

When multiple users are simultaneously communicating with each other such that each user belongs to a single communications pair, then in the absence of noise, each transmitted signature will be reliably received. However the combination of frequencies representing the summation of all signatures being transmitted, may contain additional n-tuples of frequencies representing a user's valid signature. The occurrence of such 'false' signatures depends upon the multiple access properties of the signature sets being used.

When a user receives a 'false' signature during valid transmission, a choice is made at random between the two signatures. If appropriate, an erasure can be generated to enhance the performance of an external error correcting code.

A 'false' signature received in the absence of transmission may be interpreted as the beginning of valid transmission from another user. The issue can be resolved over several received periods as successive 'false' signatures are unlikely to occur.

When two users try to communicate simultaneously with a third user a 'collision' occurs. This can be dealt with if the receiver transmits an engaged signature to warn other users. This is in sharp contrast to Aloha and Slotted Aloha where collisions occur for any two simultaneous channel accesses.

As an alternative or in addition, simultaneous access can be achieved with a user by assigning it one or more additional blocks of signatures.

An advantage of the present invention is that access does not require handshakes between users nor are there channel assignment overheads.

Furthermore, if each user is synchronised to the network manager there are no acquisition overheads, as the receiver can demodulate the data as soon as one of its signatures appears on the channel.

Redundant signatures may be allocated to provide inner coding. Reed Solomon codes for example, may be used as an outer code. Such coding provides further protection for the message.

By allocating some users signatures with more elements, communications with those users will be more protected against errors.

By allocating a user more signatures, more bits per symbol can be communicated to that user.

By appropriate choice of N, n and k the system can be dimensioned to provide an acceptable error rate for all but p % of time for a specified number of users with specified traffic statistics.

The efficiency of use of the resource will be maximised if there is an upper limit to the number of frequencies that any two signatures can have in common.

It should be appreciated that the present invention allows for considerable flexibility in use. A block of signatures may be "customised" for the requirements of a particular user by using more or less frequencies, and hence more or less data carrying capacity. A user may have different blocks of signatures for different data rates. Similarly, user groups may readily share communications by utilising a common block of signatures.

If the system is implemented in software, signatures can be regularly changed by down loading new code books for encryption and for preventing unauthorised access, to enhance security.

A particularly advantageous application of the present invention is in the areas of low data rate VSAT networks and mobile communications.

An embodiment of the present invention will now be described with reference to the accompanying figures, in which.

3.0 PREFERRED EMBODIMENT OF INVENTION

The embodiment of the invention detailed below is configured so as to take advantage of Digital Signal Processing technologies, rather than conventional analogue hardware.

It is desired to provide a cheap, efficient and versatile multiple access system suitable for large scale manufacture.

It is preferred that the digital processing be implemented in software, to allow the hardware mixing stages to be standardised, and so enable the system to be re-configured for various transmission rates and multiple access performance characteristics, through software updates issued by the system manager.

However alternative implementations will be apparent to those skilled in the art and are encompassed within the general inventive concept of this invention.

Figure 1A:
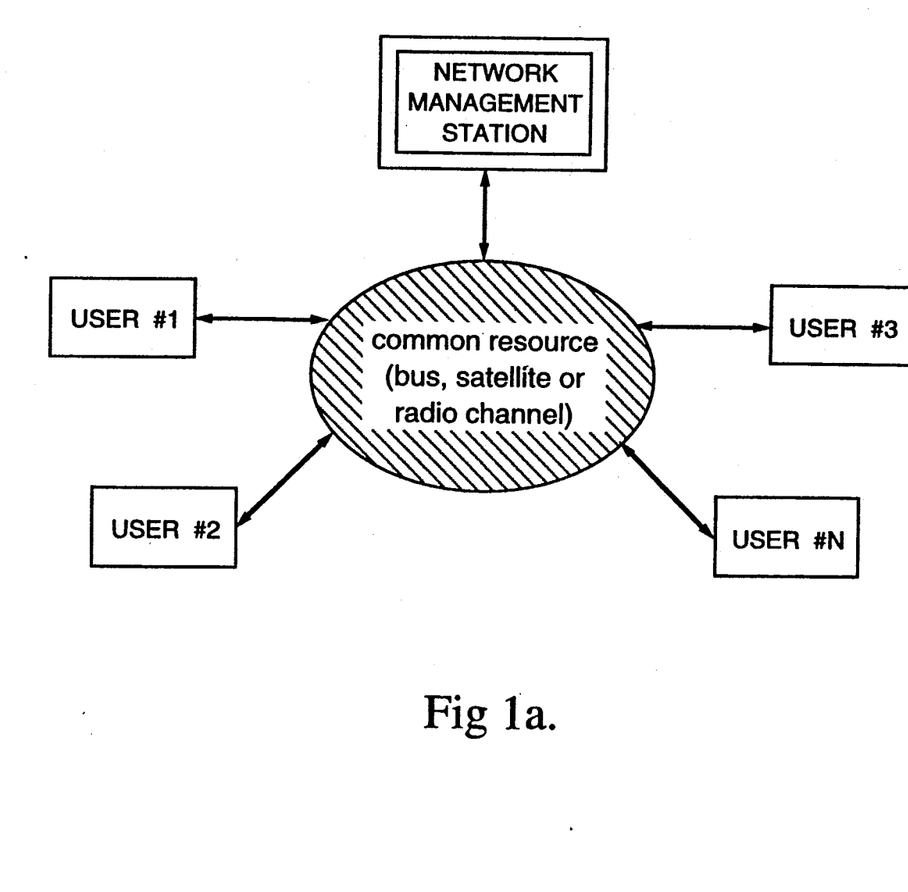
FIG. 1(a) is a schematic of a point to point network.
Figure 1B:
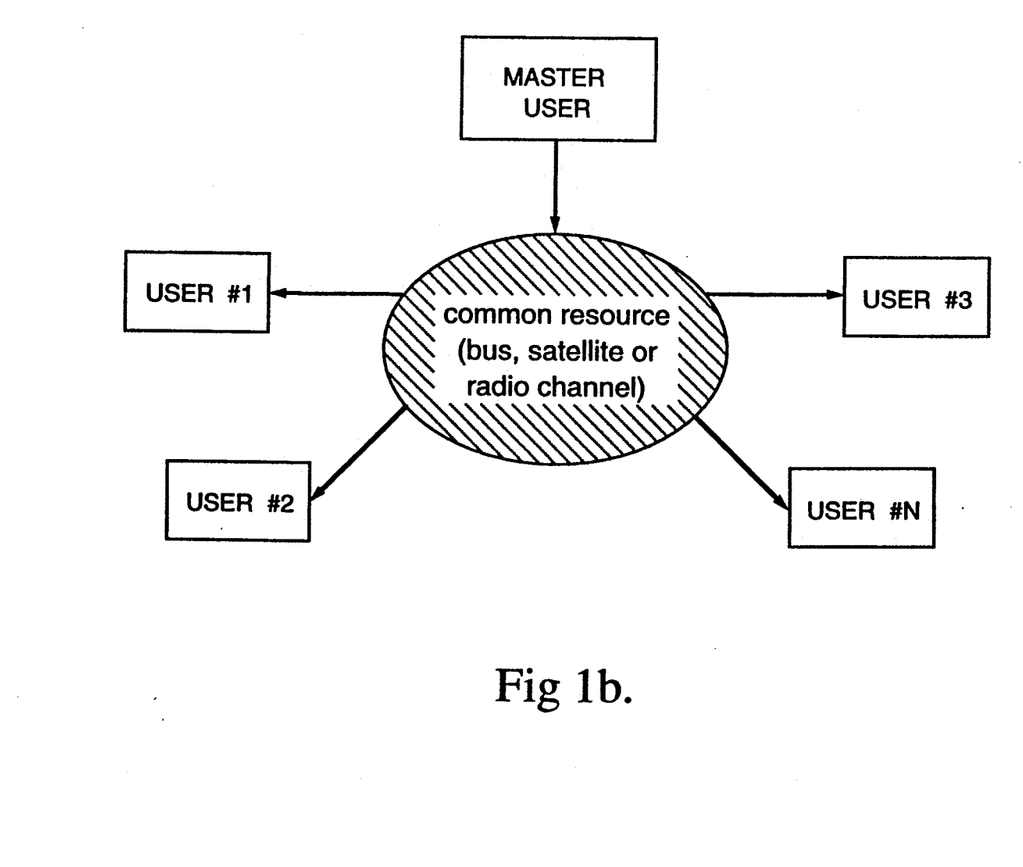
FIG. 1(b) is a schematic of a point to multi-point network.

FIG. 1(a) shows schematically the operation of a generic point to point network. A plurality of users communicate with each other via a common resource—for example a radio channel—which is controlled in turn by a network management station of some type. FIG. 1b illustrates a generic point to multi-point network, where one or more users (the Master User in the figure) may communicate to one or more other users simultaneously, via a shared resource.

Figure 2A:
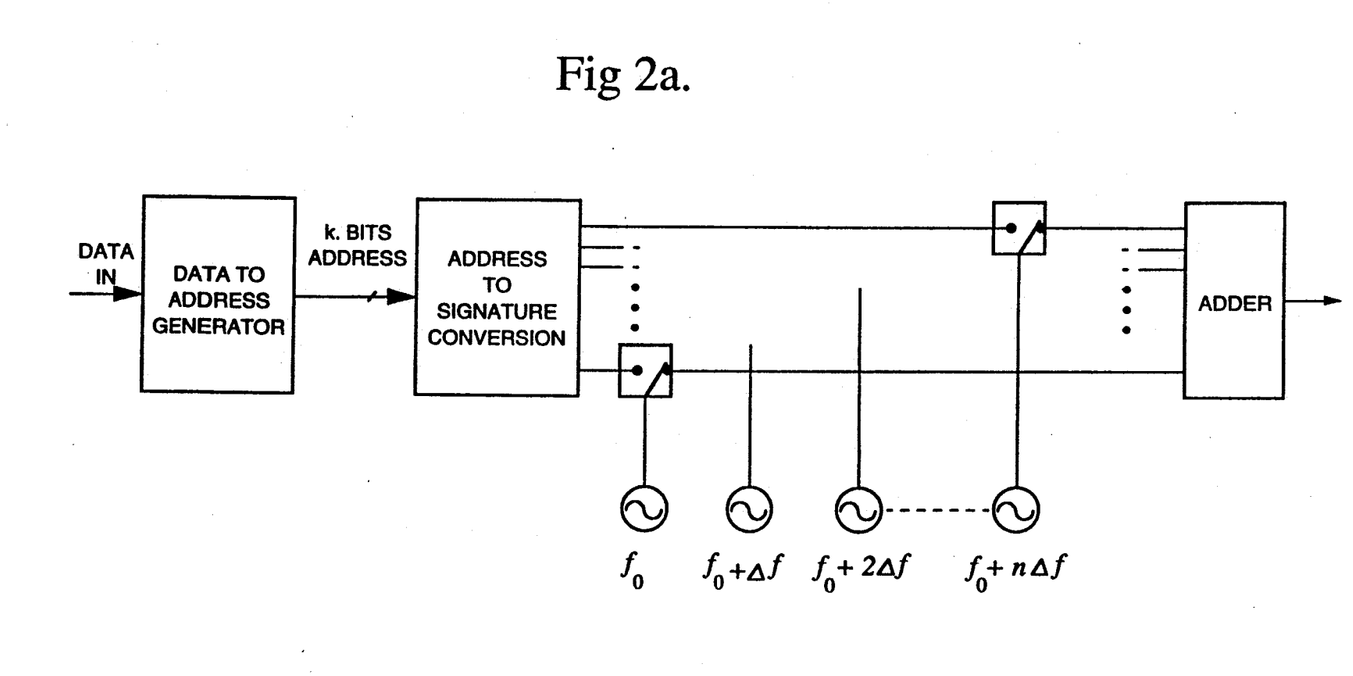
FIG. 2(a) is a conceptual schematic of an exemplary FCMA transmitter.

FIG. 2(a) illustrates one concept of a transmitter according to the present invention. Data input is converted to a sequence of address bits according a predetermined code. This sequence of address bits is then converted to a signature comprising specific frequencies. The signature is then assembled, preferably by adder means, into a single multifrequency transmission, and disseminated by appropriate means via the shared resource. It should be appreciated that the data may be received and decoded by any party who is receiving the appropriate block of signatures, and is aware of the address coding and any other inner coding which is in use. Thus, multi-point reception is an inherently available feature of the system.

Figure 2B:
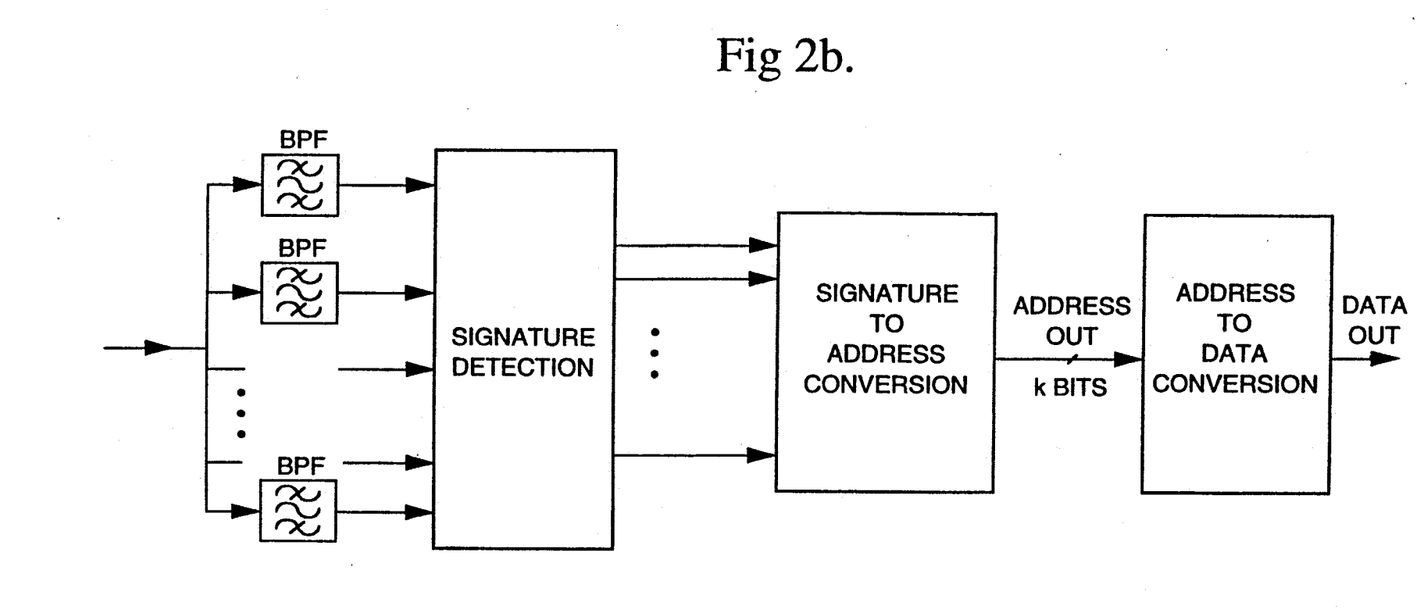
FIG. 2(b) is a conceptual schematic of an exemplary FCMA receiver.

FIG. 2(b) illustrates one concept of a receiver according to the present invention. Bandpass filters are provided for receiving each frequency which is part of the assigned block for a user. Upon receiving transmissions within the required bandwidth, these are passed to the signature detection means, which is arranged to detect whether a valid signature has been received, based on the energy levels at the appropriate frequencies. Contention and false signatures are discussed below. The detected signature is then converted to an address sequence of bits, which is in turn converted to data.

Figure 3A:
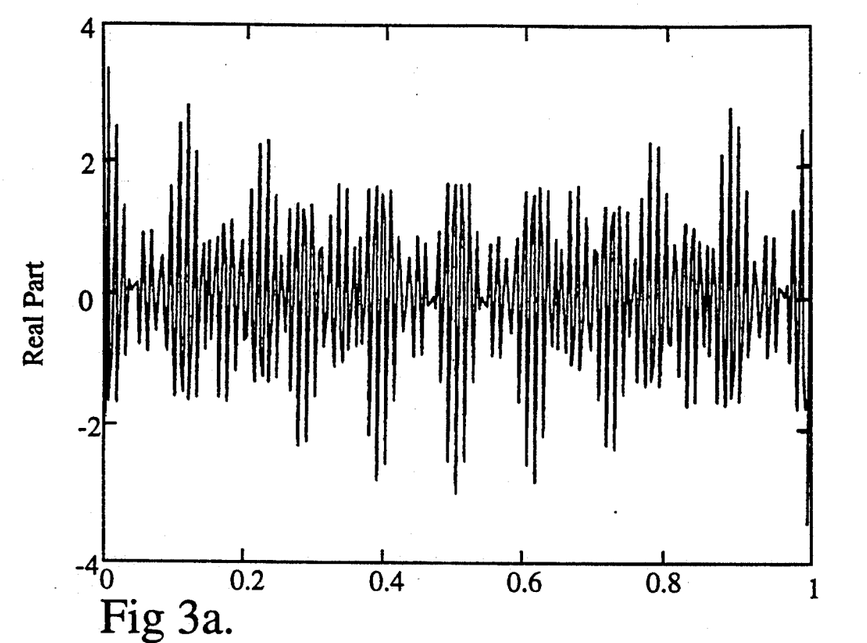
FIGS. 3(a) and 3(b) are graphs showing the time domain FCMA/signal.
Figure 3B:
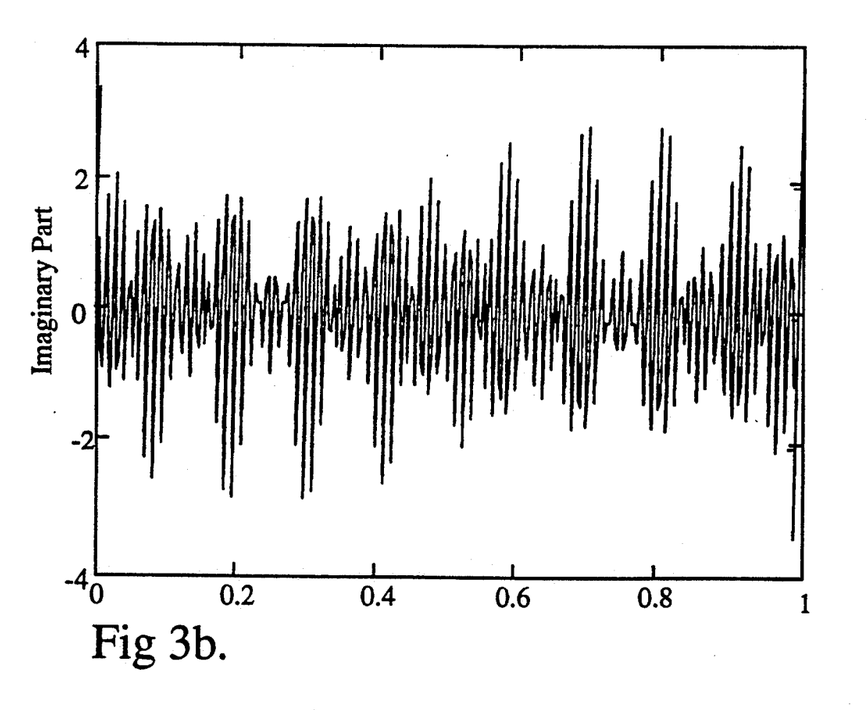
Figure 3C:
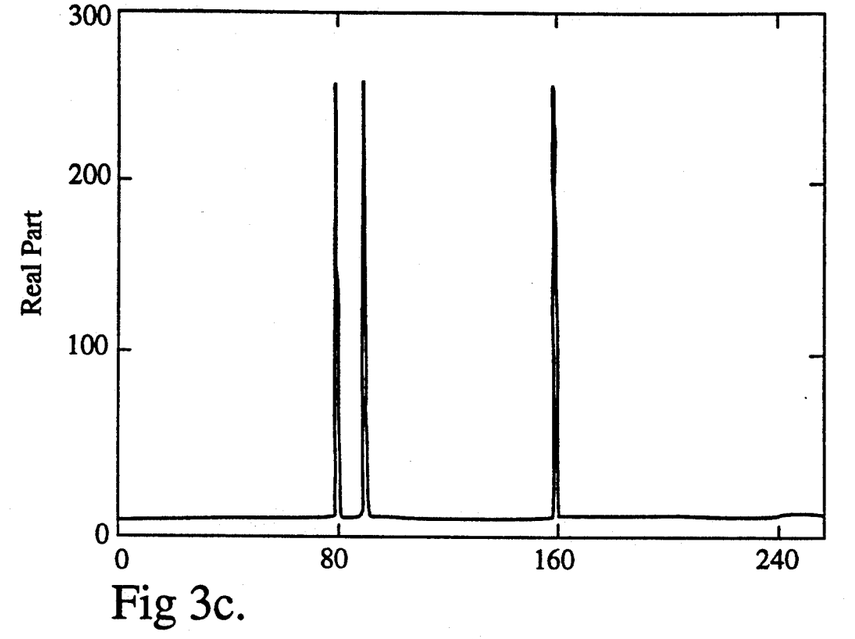
FIGS. 3(c) and 3(d) are graphs showing the frequency domain FCMA signal.
Figure 3D:
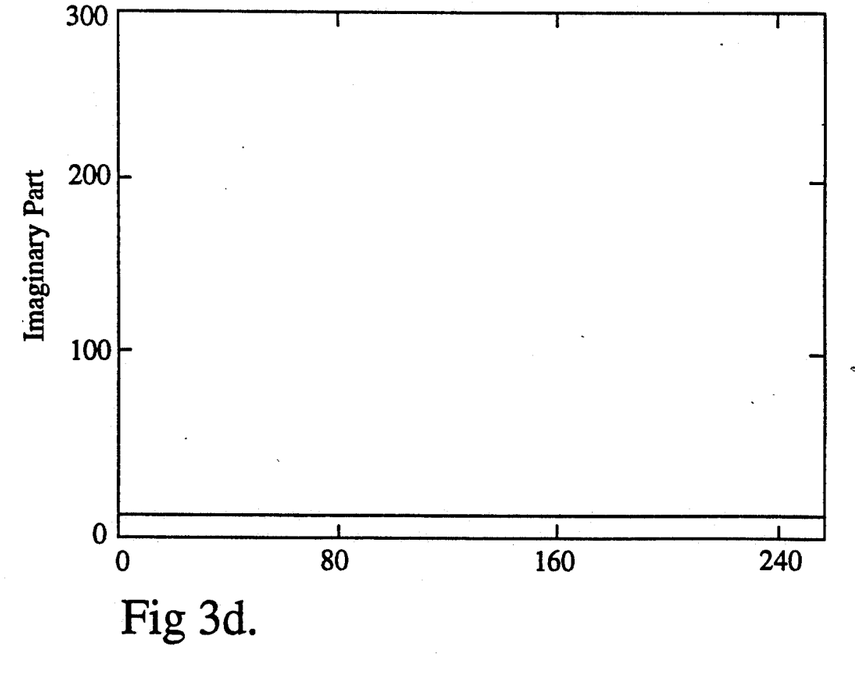

The bandpass filters may be effected by known hardware according to any known means. A preferred technique is to sample the time domain signal, take the Fast Fourier Transform (FFT), and process the resulting image to search for signatures. FIG. 3(a) illustrates typical real and imaginary components of a time domain signal according to the present invention. FIG. 3(b) similarly illustrates the frequency domain signal derived as described from the time domain. The required FET may be performed using conventional DSP chips running appropriate software, or using application specific hardware, as is known in the art. The receiver detects a transmission by the presence of one of its signatures appearing on the channel. During reception, the software algorithm selects the user signature which has the highest correlation with the received signal.

A further aspect of the present invention is that the system may be operated synchronously, wherein all users are aligned to a common frame timing schedule, or asynchrously, where signature synchronisation must be achieved separately for each received transmission.

Figure 4:
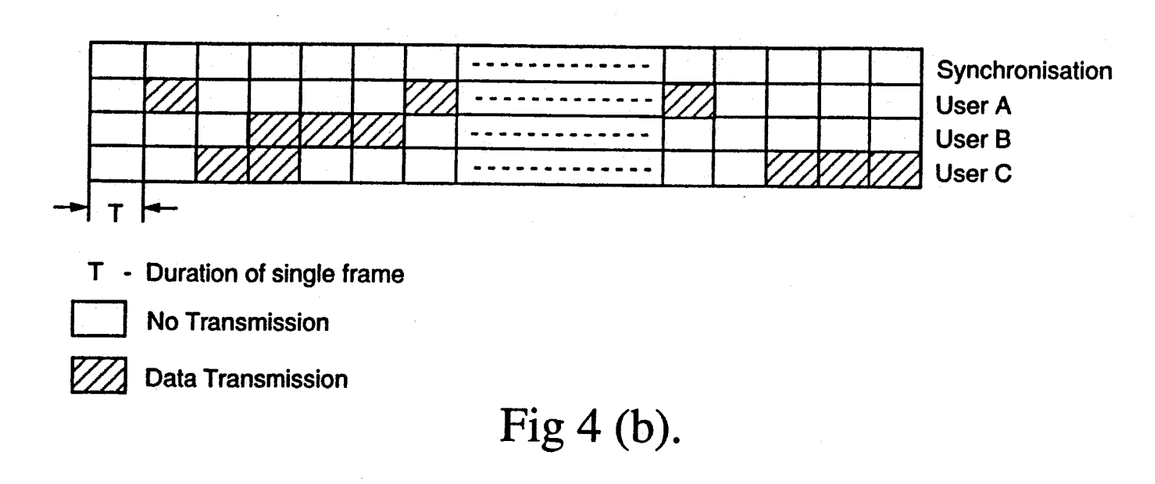
FIG. 4(a) is a schematic illustration of a satellite network.
FIG. 4(b) is a timing diagram for a Synchronous Network.
FIG. 4(c) shows a timing diagram for an Asynchronous Network.
Figure 4A:
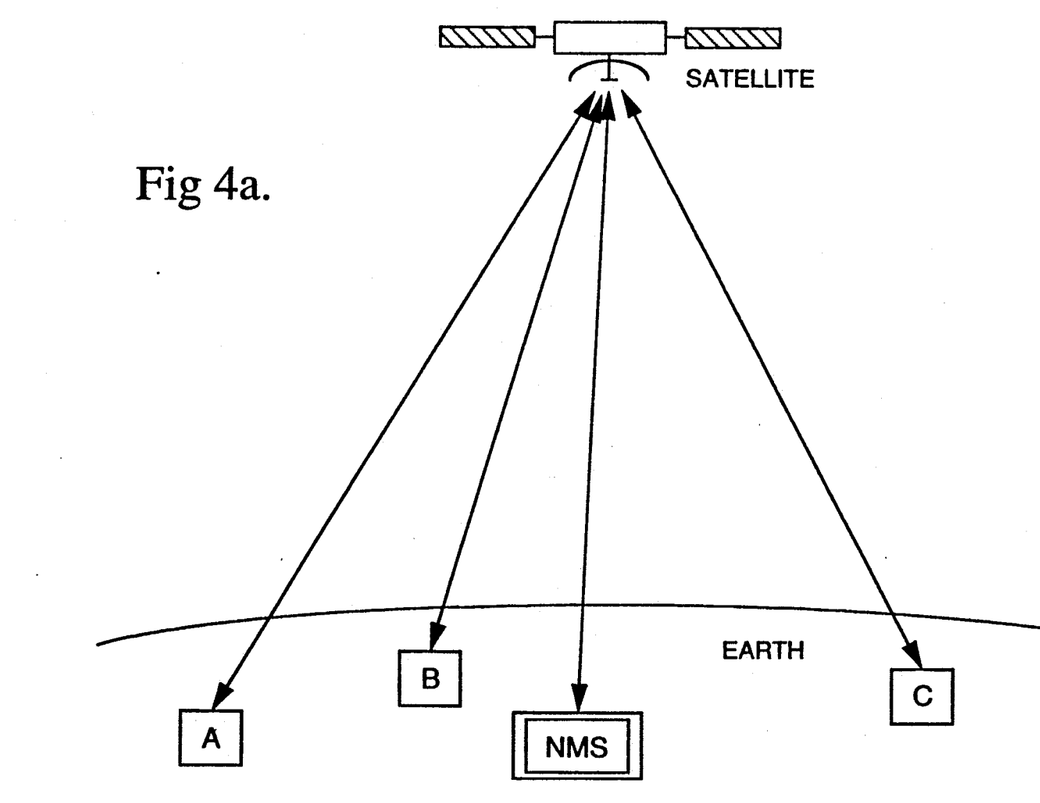

FIG. 4(a) illustrates a satellite system including 3 users A, B and C, and a network management station. It will be understood that the principle is equally applicable to other shared media.

FIG. 4(b) illustrates the timing within a synchronous network. This synchronism is preferably achieved by digitally monitoring the phase of an in-band tone sent by the network manager. Such alignment allows the user terminal to extract data as soon as its signature is received on the channel.

The present invention may be implemented asynchronously if desired, however, this has several disadvantages. FIG. 4(c) illustrates timing in an asynchronous network. Such a system exhibits decreased performance, as discontinuities in other users' signatures would result in spectral spillover to adjacent frequency "bins" (i.e. frequencies which may constitute part of a signature also being detected as adjacent frequencies), causing an increased incidence of eroneous detections. Further, a reserved preamble would be required from the transmitter to allow the receiver to synchronise to the beginning of its signature frame.

If the signature detection means cannot distinguish which of its signatures is received, the receiver may be arranged to select at random, or generate an erasure, depending upon the error correcting systm being user. Errors and erasures are in turn dependent upon network traffic conditions, and the multiple access properties of the codes being used.

The DSP and FFT operations are performed on complex samples, allowing frequency translation by single side band modulation. Thus, in a double sideband system, twice the number of frequencies are available for signature allocation.

Bandwidth utilisation may be further improved by also allowing phase encoding of each frequency.

Figure 5A:
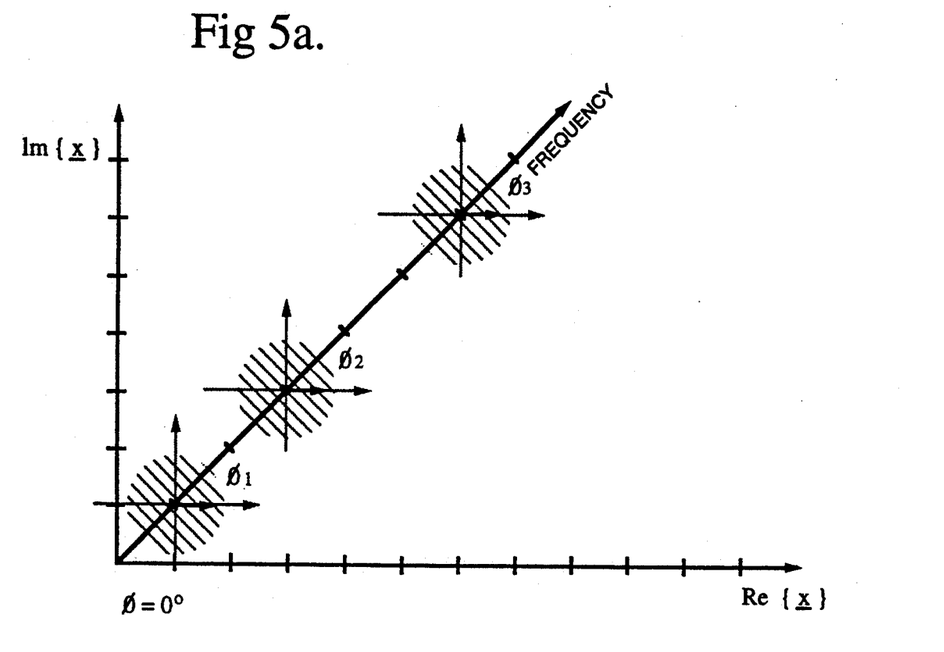
FIG. 5(a) illustrates a signature in a single-phase encoded frequency.
Figure 5B:
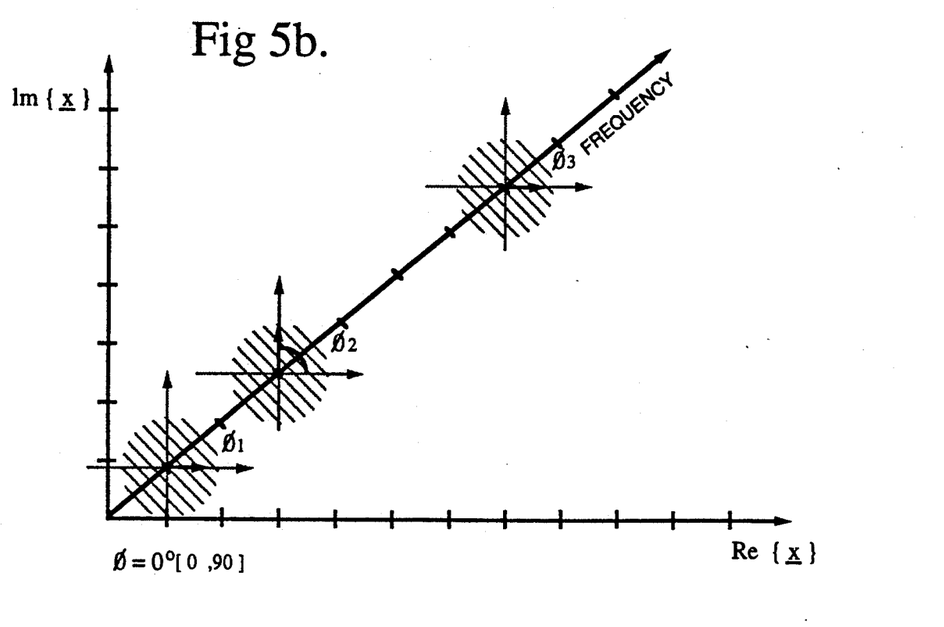
FIG. 5(b) illustrates a signature formed from dual-phase encoded frequencies.
Figure 5C:
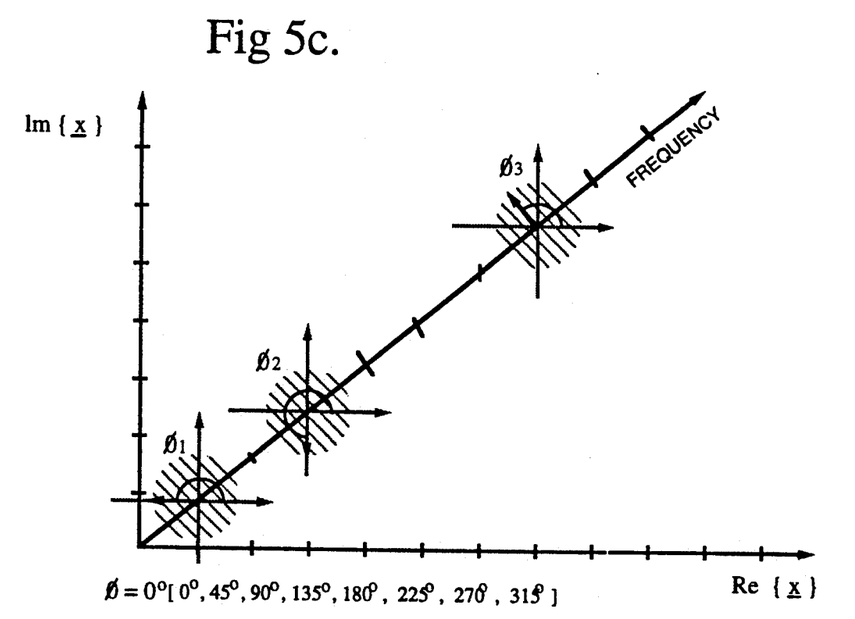
FIG. 5(c) illustrates a signature formed from multi-phase encoded frequencies.

Referring to FIG. 5(a), this illustrates a sample signature in a single phase encoded FCMA system according to the present invention. FIG. 5(b) shows a sample signature in a dual phase encoded FCMA stystem. In this case, phases have been selected as orthogonal. FIG. 5(c) is a sample signature where there are a total of eight possible phase states for each frequency. These non-orthogonal phases have the disadvantage that if opposite phases of the same frequency are transmitted synchronously by separate users, cancellation may occur. This tends to decrease detector performance, but the greatly increased number of signature elements available for assignment produces much greater system utilisation gains overall. Of course, any number of phases could be used.

Figure 6A:
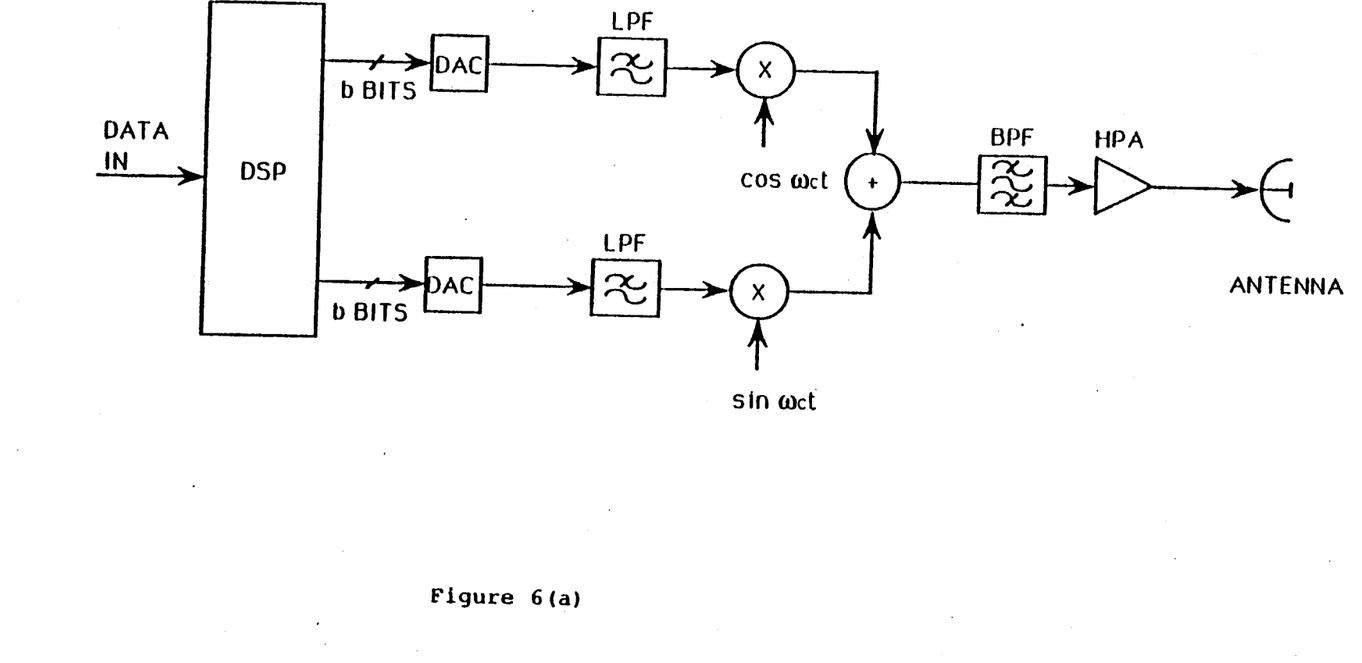
FIG. 6(a) is a schematic block diagram showing a direct up-conversion transmitter.
Figure 7A:
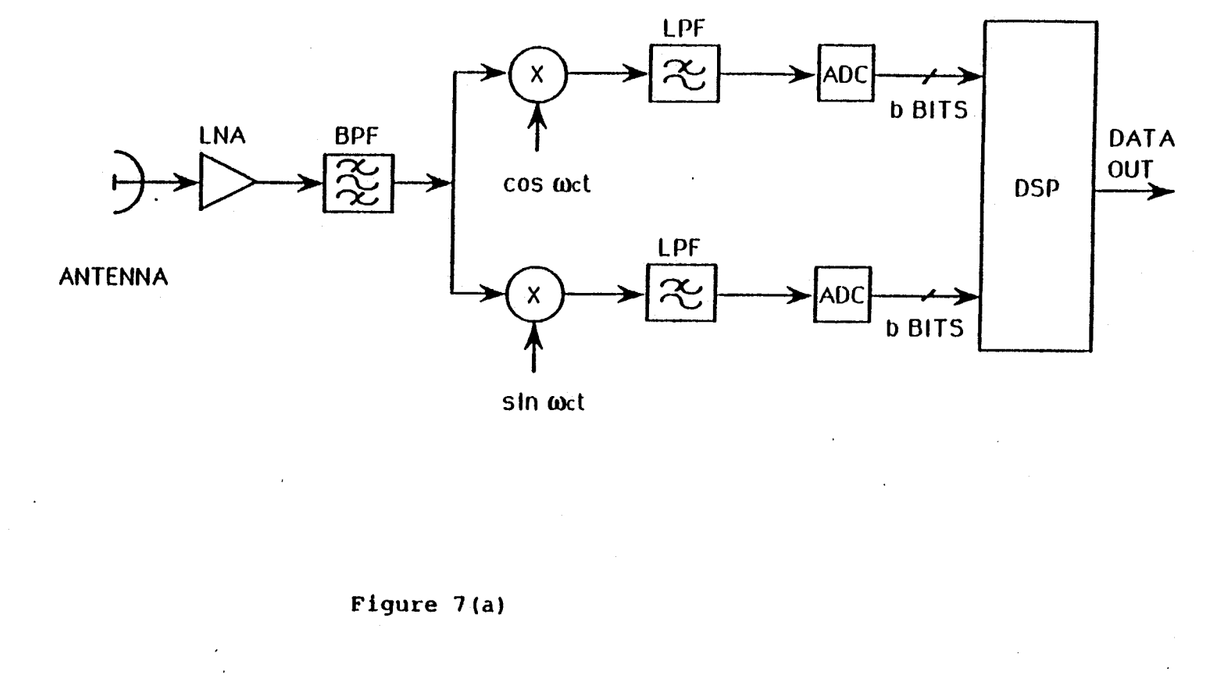
FIG. 7(a) is a schematic block diagram showing a direct down-conversion receiver.

Translation of the complex image to carrier frequencies is illustrated in FIG. 6(a) for up conversion and FIG. 7(a) for down conversion. Sine and cosine mixing frequencies are required to correctly encode and decode the two channels. Monolithic Microwave Integrated Circuit (MMIC) technology would allow direct up and down conversion in a single stage simplifying the hardware, greatly reducing its size and cost, and is preferred.

Figure 6B:
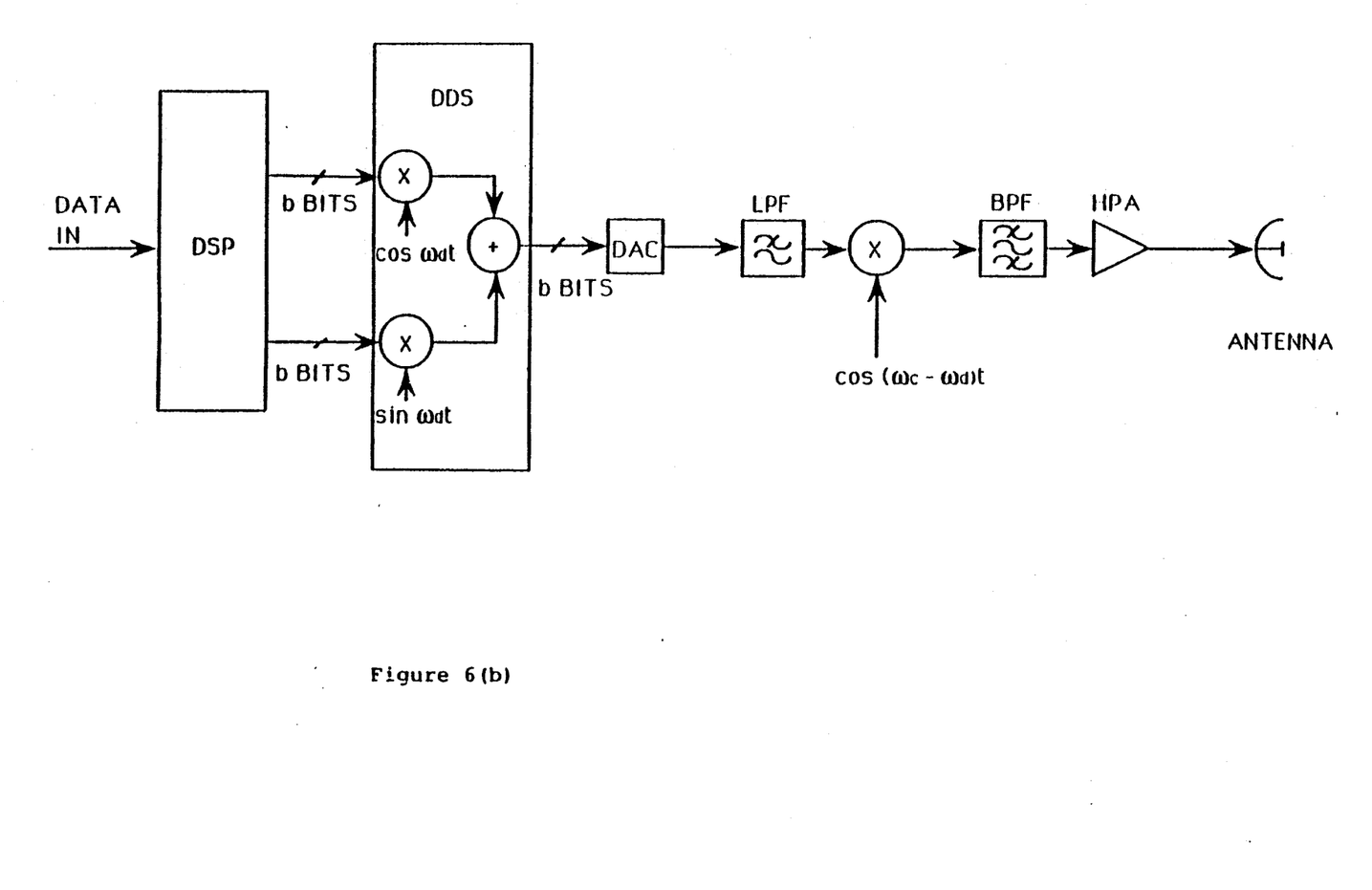
FIG. 6(b) is a schematic block diagram showing a direct Digital Synthesis (DDS) transmitter.
Figure 7B:
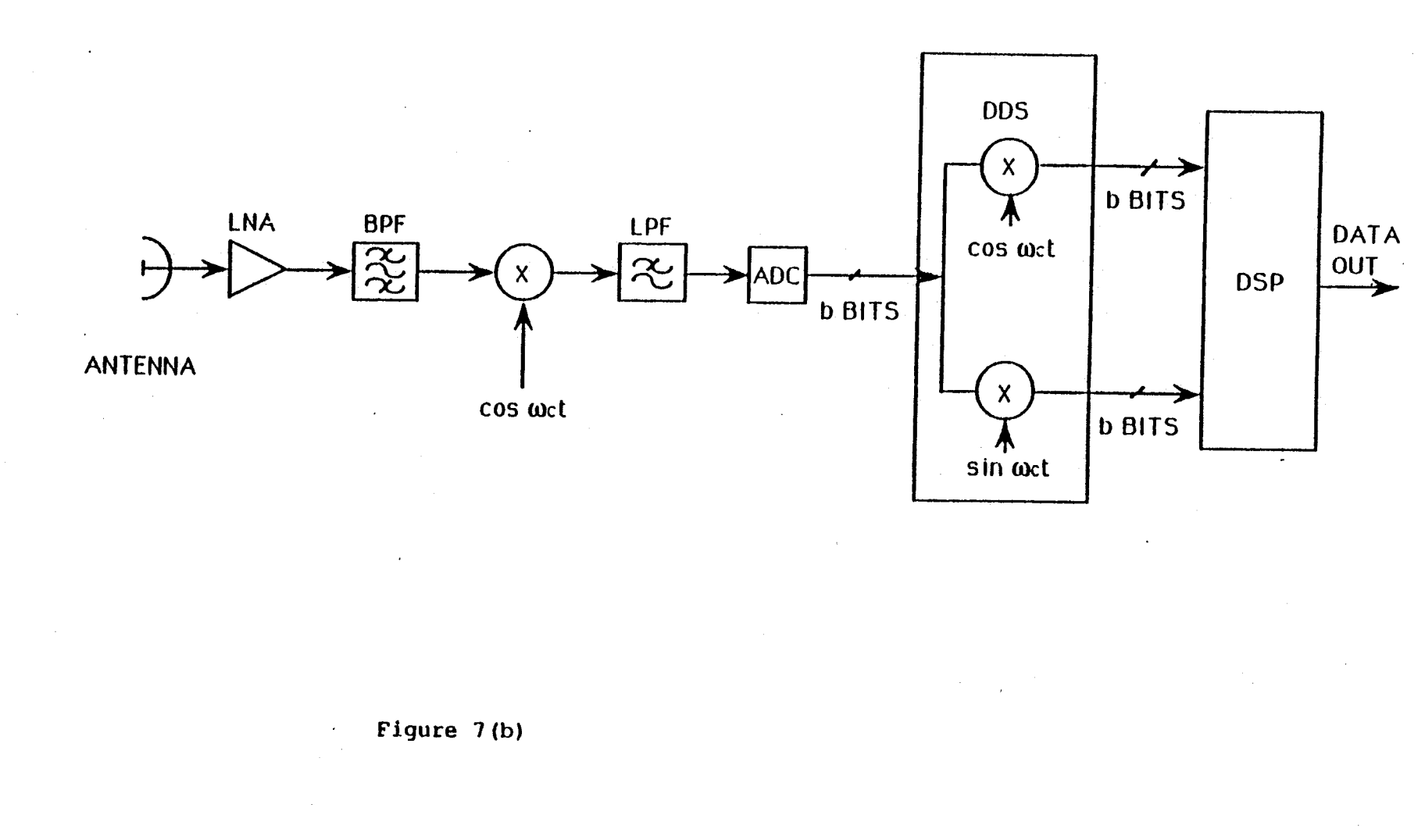
FIG. 7(b) is a schematic block diagram showing a direct Digital Synthesis (DDS) receiver.

Alternatively, the complex image could be encoded digitally by the DSP system or using digital hardware such as Direct Digital Synthesis (DDS) technology, as illustrated by FIGS. 6(b) and 7(b). This ensures the accuracy of the phases of the mixing frequencies and eliminates the need for parallel A/D and D/A stages. A further advantage of this implementation is that the local oscillator breakthrough occurs in the middle of the transmitter's frequency band, where it does not interfere with other communications systems.

It will be appreciated that while this example is provided in respect of satellite and similar carriers, analogous techniques would be applied for other shared media, as is well known in the art.

An alternative implementation of the FCMA terminal may consist of a bank of bandpass filters to extract frequency energy for reception and a set of oscillators for signature generation during transmission. The advantage of such a system is that it would not require "signature synchronisation". However its implementation would be inflexible and costly.

It should be appreciated that the foregoing is by way of example only and is by no means exhaustive of hardware implementations of the present invention.

4.0 MULTIPLE ACCESS PROPERTIES OF FCMA

The probability of an error occurring in communication due to an erroneous choice in the receiver between a number of valid received signatures can be calculated, at least in the form of an upper bound, as follows. This calculation is based on the assumption that the frequencies present in each signature are randomly chosen.

When the network is operating with x active users, each user sees the rest of the active user population as $(x-1)$ possible interferers. Now each signature contains n frequency elements out of the available set of N.

For an individual user, the probability of transmitting on one of the n frequencies, that make up a specific signature is;

$$Pa = n/N \tag{1}$$

The probability, that the remainder of the user population is not transmitting on one of the n frequencies is then;

$$Pb = (1-Pa)^{x-1} = (1-n/N)^{x-1} \tag{2}$$

The complement probability then gives the probability that the rest of the active user population is transmitting on one of the n frequencies.

$$Pc = [1 = (1-n/N)^{x-1}] \tag{3}$$

For all n elements of the signature to be present to produce a false signature the probability becomes:

$$Pd = [1 = (1-n/N)^{x-1}]^n \tag{4}$$

In the case of an M-ary system in which each user has M distinct signatures then the resulting probability of a false signature can be upper-bounded by;

$$Pf = M\, Pd = M[1-(1-n/N)^{x-1}]^n \tag{5}$$

The upper-bound results from the fact that the probability of the union of M events is always less than the sum of the individual probabilities (M Pd). The exception is when the events are mutually exclusive (orthogonal) which is not the case for FCMA.

In order to extend the above probability relation, consider the example, when the presence of signatures A, B and C results in the generation of a false signature D. For the purpose of illustration, we will assume a simple decoder structure and that user 1 is being addressed by another user with user 1's signature A; signatures B and C represent network activity being monitored by user 1, but not specifically addressed to it. We further assume that signature D is one of user 1's M signatures. User 1 must now make a decision as to whether signature A or D was sent; without any other means of discrimination, user 1 must rely on the "toss of a fair coin", this modifies the probability at (5) to give the decoded probability of a false signature Po as;

$$Po = 0.5 \cdot Pf \tag{6}$$

If more than two of user 1's signatures had been present then the roll of a die would be necessary; the number of faces on the die would be equal to the number of signatures present. In this example we will only consider the case of one false signature being simultaneously present with a genuine signature of a particular user, since this case will dominate the performance.

The active user population used in the above probability derivation is distinct and not equal to the potential population. The number of active users that can be tolerated will depend on the error rate requirement. The larger the number of signatures per user, the smaller the activity duration needed to convey a given message, thus the lower the sensitivity of throughput to the upper limit of active users.

The utilisation of a given bandwidth can be defined as the combined information throughput of all users in bits per second divided by the available bandwidth in Hertz.

Table 1 gives an example of the frequencies needed and the peak utilisation achievable for 5 simultaneous users to communicate with a symbol error of less than $10-3$ using a signature according to the present invention consisting of eight frequencies.

Unlike other random multiple access schemes, the present invention is capable of providing even for low peak simultaneous user numbers.

TABLE 1

| Frequencies | Bits/symbol consistent with 10-3 Erasure Rate | Peak Utilization Bits/sec/Hz |
|---|---|---|
| 64 | 1.3 | 0.101 |
| 128 | 8.0 | 0.3125 |
| 256 | 15.5 | 0.3027 |
| 512 | 23.2 | 0.2265 |

$n = 8, x = 5$

The erasure rates given in table 1 represent average values over all possible subsets of five users. Particular subsets may have much worse erasure rates. In this invention it is preferred to use structured rather than random signatures, in order to ensure that the erasure rate for any subset is no worse than the erasure rate averaged over all subsets.

It is preferable to use Yates Holgate Potter (YHP) codes as the means of generating signatures with a certain maximum number of common elements between signatures. YHP codes are described in detail in the following papers:

Yates K. V and Holgate D: "Code modulation of m-sequences" Electronic Letters 15, 836,1979; and Potter J. M.: "Recursive Code Generation—Based on m-sequences", Electronic Letters 16, 858, 1980; incorporated by reference herein.

A YHP code family is defined by two integers, j and k, $j \leq k$. Each code word (signature) consists of a $2^j - 1$ elements with values from the set $\{0, 1, \ldots, 2^k - 2\}$. They are generated by the following process:

1. Select two integers from the set $\{0, 1, \ldots, 2^k - 2\}$, which are the first 2 elements of the code word.

2. Generate a third integer, such that if the first two integers represented cyclic shifts of a specified length $2^k - 1$ sequence, then the shift represented by the third integer would correspond to a sequence which when modulo 2 added to the modulo 2 sum for the first two shifted sequences would result in the original sequence with zero shift.

3. Select a fourth integer from the same set, different from the first two.

4. Repeat stem 2, creating three new integers from the fourth integer and each of the previous three integers.

Repeat steps 3 and 4 until all the $2^j - 1$ elements of the code 7/rd are found.

The total number of code words and their distance properties are determined by j and k. A smaller set of code words with better distance properties can be extracted from the original set of YHP code words.

YHP codes have the advantage of considerable flexibility in terms of the number of elements in the signature and the maximum number of common elements allowable, and provide very large numbers of signatures for a given set of available freqencies.

Table 2 gives an example of performance achievable with an FCMA system using three frequency signatures based upon n=3 YHP codes. By dividing the total available codes into subsets of orthogonal signatures, each user will be deciding between orthogonal signals, thus maximising the performance in noise.

The table indicates the maximum number of orthogonal signatures per set (Q), the number of subscribers supported for the two extremes of two signatures per user, and the maximum allowable number of active users under the constraint of an erasure rate of $<10e-3$. The peak capacity can be deduced by multiplying the peak active users by the normalised bit rate.

TABLE 2

| CAPACITY OF FCMA SYSTEMS FOR 3 FREQUENCY SIGNATURES | | | | | | |
|---|---|---|---|---|---|---|
| Frequencies | Available Orthogonal Signature Directory Size | Maximum Bits per Signature | Available Bit Rate per User Normalised to Channel Bandwidth | Permitted Subscriber Cohort if Bit Rate Maximised | Permitted Subscriber Cohort if 2 signatures per Subscriber | Active Users for Erasure Rate 0.001 |
| 16 | 5 | 2.32 | 0.154 | 7 | 14 | 2 |
| 32 | 10 | 3.32 | 0.103 | 15 | 75 | 2 |
| 64 | 21 | 4.39 | 0.0686 | 30 | 300 | 3 |
| 128 | 45 | 5.49 | 0.0429 | 63 | 1386 | 6 |
| 256 | 85 | 6.41 | 0.025 | 127 | 5334 | 8 |

Table 3 gives the probability density function of the distance between the wanted and unwanted signatures for the case of two signatures per user, for 256 frequencies and 3 frequency YHP signatures for active users. The error rate in the presence of both thermal noise and other users could be found by taking the expectation error rate over the distance distribution. When the distance is three or more, performance in noise is equivalent to m-ary orthogonal signalling. By declaring an erasure when the margin between the largest and the second largest received signature is not greater than a specified threshold, the error rate can be reduced to that of m-ary orthogonal signalling provided a coding scheme is used which can correct the erasures by multiple access noise. Such coding schemes are well known in the art, and include Reed-solomon coding.

TABLE 3

| Distance | Probability |
|---|---|
| <=0 | 0.0006728 |
| 1 | 0.0134 |
| 2 | 0.1466 |
| 3 | 0.6787 |
| 4 | 0.1466 |
| 5 | 0.0134 |
| 6 | 0.006545 |
| 7 | 1.797e-005 |
| 8 | 2.626e007 |
| 9 | 1.595e-009 |

N- 255, k = 1, Users sharing channel = 7

It will be appreciated that variations and additions are possible within the general concept of FCMA described, and that these are encompassed within the invention.

We claim:

1. A multiple access communications system, which enables communications between a plurality of receivers and a plurality of transmitters, wherein communications are comprised of transmissions including combinations of substantially simultaneous signals having different frequencies each said combination addressing a predetermined receiver or receivers, each said combination further corresponding to a predetermined code to a specific message component desired to be sent to said predetermined receiver or receivers.

2. A system according to claim 1 wherein said combinations are selected within a predetermined bandwidth, said combinations being chosen so as to minimise false reception by receivers of a message component.

3. A system according to claim 1 in which all transmitters and receivers are synchronised to a common control signal.

4. A system according to claim 1, wherein at least one signal within said combination has a phase difference with respect to the other signal or signals within said combination.

5. A system according to claim 1 wherein said combinations are selected by YHP codes as hereinbefore defined with reference to the available number of signal frequencies within the available bandwidth.

6. A multiple access communications system, comprising a plurality of receivers, each one of said plurality of receivers adapted to recognise selected simultaneous signal receptions on a plurality of frequencies as addressed to said one of said plurality of receivers;

each said one of said plurality of receivers comprising means for determining the message component represented by said simultaneous signal receptions;

said system further comprising transmitter means adapted to generate according to a predetermined code a transmission comprising a plurality of signals having discrete frequencies, said transmission corresponding to a desired address and to a message component.

7. A receiver for a multipler user communications system comprising:

means for receiving a simultaneous transmission on a plurality of discrete frequency channels;

means for detecting at predetermined time intervals the sequence of frequency channels which are currently simultaneously receiving a signal;

control means for determining whether said sequence of simultaneously received signals corresponds according to a predetermined code to a message component; and means for converting a received sequence of simultaneously received signals of frequency channels corresponding to a message component into the corresponding message component.

8. A receiver according to claim 7, further comprising means for generating a control signal when a valid message component is being received, said control signal being transmitted so as to advise other users that said sequence of frequency channels or a block of sequences of frequency channels are unavailable for reception.

9. A receiver according to claim 7, wherein said transmission includes quadrature signals, further comprising means for generating I and Q components from said received transmission, and means for processing said I and Q components in parallel prior to conversion of said received sequence into a data signal.

10. A transmitter for a multiple user communications system, comprising:

means for converting input message components to a sequence of digital address codes;

means for generating a plurality of signals having discrete frequencies corresponding to said address code; and means for combining said signals into a single substantially simultaneous transmission.

11. A transmitter according to claim 10, wherein said means for converting input message components comprises means for determining the desired receiver of said message and determining the block of address codes which have been allocated to said receiver;

means for selecting address codes within said block which correspond to the message components to be sent; and means for generating the selected address codes.

12. A transmitter according to claim 11, wherein the predetermined allocation of address codes corresponds to the selection of combination signals having discrete frequencies within an allocated transmission bandwidth, said combinations being selected in accordance with YHP codes as hereinbefore defined.

13. A transmitter according to claim 10, wherein said digital address codes are generated as two parallel data streams which are substantially converted one into Q and I components of said transmission.

* * * * *